US012711682B2

(12) United States Patent
Qiang et al.

(10) Patent No.: US 12,711,682 B2
(45) Date of Patent: Aug. 18, 2026

(54) TRAINING OF NEURAL NETWORK FOR ATTENUATION CORRECTION IN PET/CT

(71) Applicant: Canon Kabushiki Kaisha, Tokyo (JP)

(72) Inventors: Yi Qiang, Vernon Hills, IL (US); Xiaohui Zhan, Vernon Hills, IL (US); Wenyuan Qi, Vernon Hills, IL (US); Jeffrey Kolthammer, Vernon Hills, IL (US)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 18/151,497

(22) Filed: Jan. 9, 2023

(65) Prior Publication Data

US 2024/0233213 A1 Jul. 11, 2024

(51) Int. Cl.

*G06T 12/30* (2026.01)
*G06T 12/10* (2026.01)
*G06T 12/20* (2026.01)

(52) U.S. Cl.

CPC .... *G06T 12/30* (2026.01); *G06T 2207/10104* (2013.01); *G06T 2207/20084* (2013.01)

(58) Field of Classification Search

CPC ......... G06T 11/008; G06T 2207/10104; G06T 2207/20084; G06T 11/005; G06T 11/006; A61B 6/037

See application file for complete search history.

(56) References Cited

U.S. PATENT DOCUMENTS 6,950,494 B2 9/2005 Vija et al.
2007/0238968 A1* 10/2007 Rappoport ............ G01T 1/1611 600/407
2020/0281543 A1* 9/2020 Sahbaee Bagherzadeh ................ A61B 6/032
2021/0090212 A1* 3/2021 Piat ........................ G06N 3/047
2021/0093266 A1* 4/2021 Sahbaee Bagherzadeh ............... A61B 6/032
2022/0035961 A1* 2/2022 Ziabari ................. G06T 7/0002
2022/0091286 A1 3/2022 Panin et al.

(Continued)

FOREIGN PATENT DOCUMENTS

CN 107481297 B 6/2021
JP 2018-57867 A 4/2018

OTHER PUBLICATIONS

Luyao Shi et al., A Novel Loss Function Incorporating Imaging Acquisition Physics for PET Attenuation Map Generation using Deep Learning; 8 pages.

(Continued)

*Primary Examiner* — Amandeep Saini
*Assistant Examiner* — Andrew S Budisalich
(74) *Attorney, Agent, or Firm* — Oblon, McClelland, Maier & Neustadt, L.L.P.

(57) ABSTRACT

A method is provided for generating an attenuation map for PET image reconstruction. The method includes training a deep convolutional neural network (DCNN) model by minimizing a loss function between initial input image data and the attenuation map generated by a spectral CT scan as supervised data. Further, the method includes obtaining PET data from a scan of a subject and reconstructing a PET image from the PET data and an attenuation map output from the DCNN. The initial input image data can be from a conventional CT scan with or without beam-hardening correction or the input image data can be from a phantom, a simulation, or a SPECT image.

12 Claims, 8 Drawing Sheets

(56) References Cited

U.S. PATENT DOCUMENTS

| | | | | |
|---|---|---|---|---|
| 2022/0358693 | A1 * | 11/2022 | Connell | G06T 11/005 |
| 2022/0395244 | A1 | 12/2022 | Taubmann et al. | |
| 2023/0009528 | A1 * | 1/2023 | Schaefferkoetter | A61B 6/037 |

OTHER PUBLICATIONS

European Extended Search Report issued Feb. 12, 2024 in European Application No. 24150922.3, 7 pgs.

* cited by examiner

TRAINING OF NEURAL NETWORK FOR ATTENUATION CORRECTION IN PET/CT

FIELD

The present disclosure is directed to an apparatus and method for providing increased accuracy of attenuation maps for use in medical imaging, such as Positron Emission Tomography (PET) imaging.

BACKGROUND

Positron emission tomography (PET) is an imaging technique that uses radioactive substances known as radiotracers, to visualize and measure changes in metabolic processes, and in other physiological activities. This is a minimally invasive means to examine the biochemistry of the human body. Blood flow, chemical composition, and absorption can all be visualized and measured with the help of a radiotracer and PET. Different tracers are used for various imaging purposes. For example, fluorodeoxyglucose, a radiolabeled analog of glucose, may be used to detect cancer, sodium fluoride may be used to detect bone formation, and oxygen-15 is often used as a tracer to detect blood flow. Gamma rays are emitted by the radio-tracers and detected by gamma camera to form a three-dimensional image.

PET scan images can be reconstructed using results of a CT scan, which can be performed during the same session. PET scanners that incorporate a CT scanner are known as PET/CT scanners. The image reconstruction in PET relies on knowledge of material composition of a patient or a phantom, (medical imaging phantoms are objects used as stand-ins for human tissues) to properly take into consideration the attenuation of 511 keV gamma rays through matter before reaching detectors. In PET/CT, the material information is extracted based on CT numbers and possibly improved with simple material classification from the CT image. The attenuation for the 511 keV gammas is then theoretically calculated based on the material information with associated attenuation cross-section. One example of this traditional method is described in U.S. Pat. No. 6,950,494. The accuracy in attenuation estimation using the above traditional method is limited because the effective energy of an X-ray along different paths varies and is not uniform. This impacts the accuracy of CT reconstruction and produces beam-hardening artifacts such as "cupping" where CT numbers at the center of the object are different than at the periphery. Another problem is that the effective energy varies due to changes in scan protocols, e.g., tube kVp, collimator settings etc., as well as no or naïve classification of organs or materials. In extreme cases, metal artifacts will introduce errors. Metal artifacts have been reported in 10% of patients in some studies (see Croxford, et al, Journal of Nuclear Medicine, May 2010). Extrapolation of gamma attenuation from the nominal 70 keV in a CT scan to 511 keV needed by PET reconstruction further amplifies the above errors.

Material dependent "conversion factors" are sometimes used to adjust for these problems, but this does not solve the above problems well (see Chuanyong Bai, Ling Shao, A. J. Da Silva and Zuo Zhao, "A generalized model for the conversion from CT numbers to linear attenuation coefficients," in IEEE Transactions on Nuclear Science, vol. 50, no. 5, pp. 1510-1515, October 2003, Doi: 10.1109/TNS.2003.817281). Thus, what is needed is a better way to generate an attenuation map for a PET scan.

SUMMARY

In the present disclosure, a neural network is trained to directly translate an image, such as from a single-energy computed tomography (CT) image into an attenuation map for 511 keV gamma rays. This can be done using CT images with or without beam-hardening correction (BHC). In one embodiment, by providing a trained neural network, such as a deep convolutional neural network (DCNN), one can more accurately translate CT images into attenuation coefficients for 511 keV photons and produce more accurate quantitative results in PET imaging. The neural network can be used to capture signatures of different material types, including hardening artifacts and metal artifacts that occur due to variation in effective X-ray energy and incorrectly assigned material type. The neural network can be trained to capture these signatures and improve accuracy in material identification and quantification.

Accurate attenuation maps are used as targeting output of DCCN training. Accurate material information is needed to generate the needed attenuated map. For CT scanners that are equipped with advanced spectral enabled hardware (for material decomposition), such as a kV-switching X-ray tube, a dual-layer detector, a photon-counting detector, or a dual X-ray source, they can natively produce spectral CT images with material composition information, and hence generate accurate attenuation maps for 511 keV photons. For conventional CT, generalized spectral CT protocols and material decomposition can be used instead. By scanning an object at different X-ray energies, followed by a generic material decomposition process of combining different single-energy CT images, the composition of the underlying material in the object can be known.

In one embodiment, the goal of the training is to estimate a translation function that minimizes a cost function, so that the output can well resemble the reference attenuation map produced through the spectral CT protocol. The training of the neural network can also be improved with augmented data from simulations with digital phantoms with known material compositions. When fully trained, the neural network directly produces the translation function, converting one or more CT images into an attenuation map that is used in PET reconstruction. This method can be generalized to produce attenuation maps using data other than CT data, such as data from magnetic resonance (MR) imaging, and can also be applied to other imaging modalities, such as single-photon emission computerized tomography (SPECT).

One method of the present disclosure comprises receiving CT image data of a subject, generating an attenuation map for PET image reconstruction by inputting the received CT image data to a deep convolutional neural network (DCNN) model that outputs the attenuation map, wherein the DCNN model was trained by using training input image data and corresponding training attenuation map data generated from spectral CT image data.

Another method of the present disclosure comprises receiving Positron Emission Tomography (PET) attenuation data of a subject; and generating an attenuation map for PET image reconstruction by inputting the received PET attenuation data into a trained deep convolutional neural network (DCNN) model that outputs the attenuation map, wherein the DCNN model was trained by using training input image data and corresponding training attenuation map data generated from PET data.

According to another embodiment, there is a provided an apparatus, comprising processing circuitry configured to receive computed tomography (CT) image data of a subject; and generate an attenuation map for Positron Emission Tomography (PET) image reconstruction by inputting the received CT image data to a trained deep convolutional neural network (DCNN) model that outputs the attenuation map, wherein the DCNN model is trained using training image data and corresponding training data from spectral CT image data Note that this summary section does not specify every embodiment and/or every incrementally novel aspect of the present disclosure or claimed invention. Instead, this summary only provides a preliminary discussion of different embodiments. For additional details and/or possible perspectives of the disclosed embodiments, see the Detailed Description section and corresponding figures of the present disclosure, as further discussed below.

DETAILED DESCRIPTION

In nuclear medical imaging. PET scans suffer from accuracy in attenuation estimation. In the disclosed embodiments, accuracy is improved by the use of a trained Deep Convolutional Neural Network Model (DCNN), alternately referred to as a "neural network" or a "DCNN model" in this disclosure.

Figure 1A:
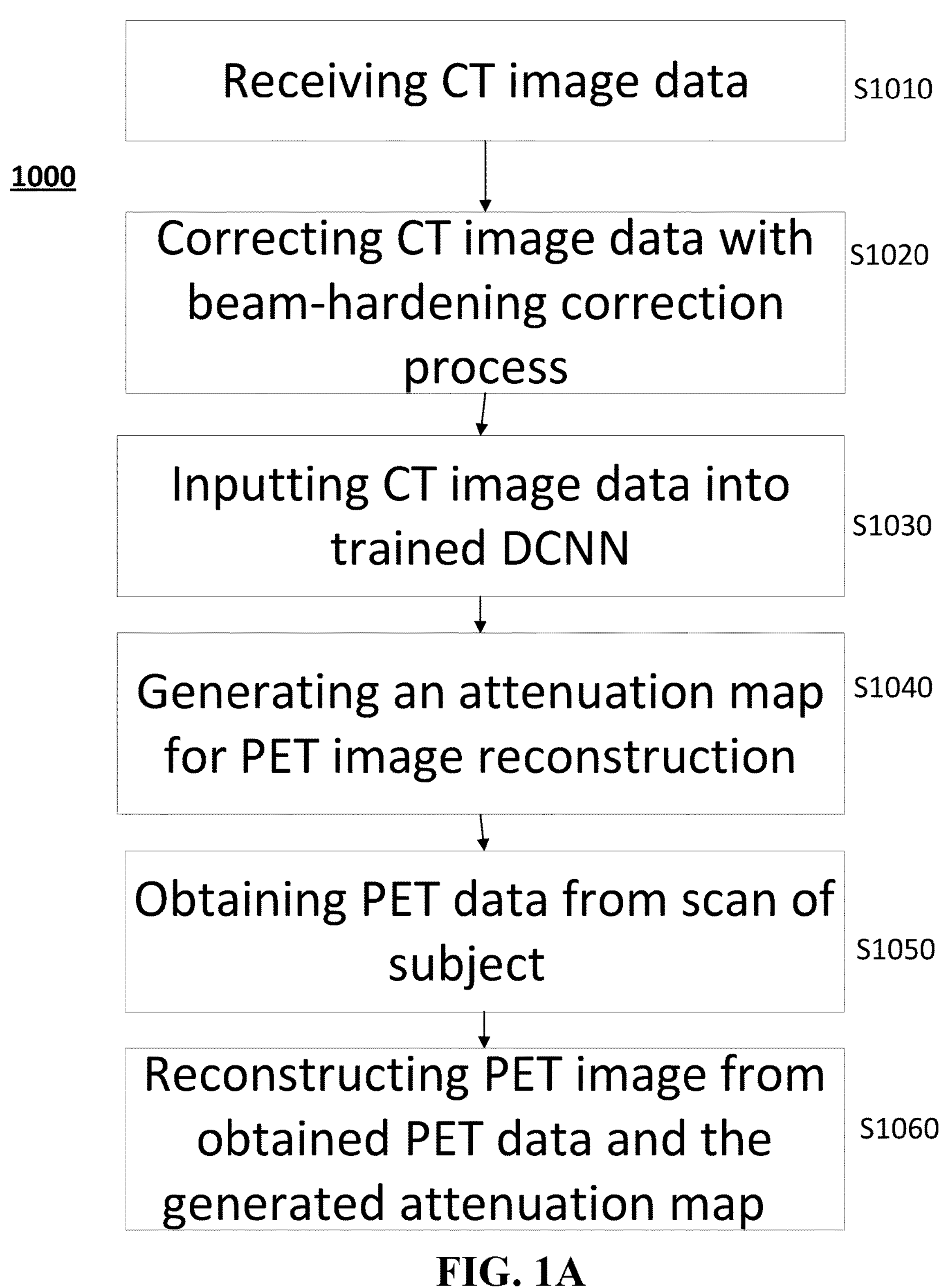
FIG. 1A illustrates a flow chart of one of the disclosed methods of receiving CT image data, inputting the CT image data into a trained DCCN model, generating an attenuation map for PET image reconstruction, obtaining PET data from a scan of a subject, and reconstructing a PET image from the obtained PET data and the generated attenuation map.

FIG. 1A illustrates a flow chart 1000 of one of the disclosed methods.

In step S1010, CT image data is received. The received CT image data can be CT data from one scan, or multiple scans performed at different times, of a subject. The multiple scans can be made at a single energy level or at multiple energy levels.

In step S1020, beam-hardening correction can be optionally performed. Beam-hardening can be performed using beam-hardening software which can, for example, use a repetitive correcting technique. Alternately, the CT scanner can be calibrated by use of a phantom to control or correct beam-hardening artifacts like cupping or streaking.

In step S1030, the CT image data is input into a previously trained DCCN model trained to output an attenuation map. The training of the DCNN model, as described below, can be performed with data derived from one or more CT scans, from PET-derived attenuation measurements, from high-dose spectral images of a phantom and/or from a digital phantom.

In step S1040, the attenuation map is generated and output by the DCCN model based on the input image data.

In step S1050, PET data is obtained from a PET scan of the subject.

In step S1060, a PET image of the subject is reconstructed from the obtained PET data using the attenuation map generated by the DCNN.

Figure 1B:
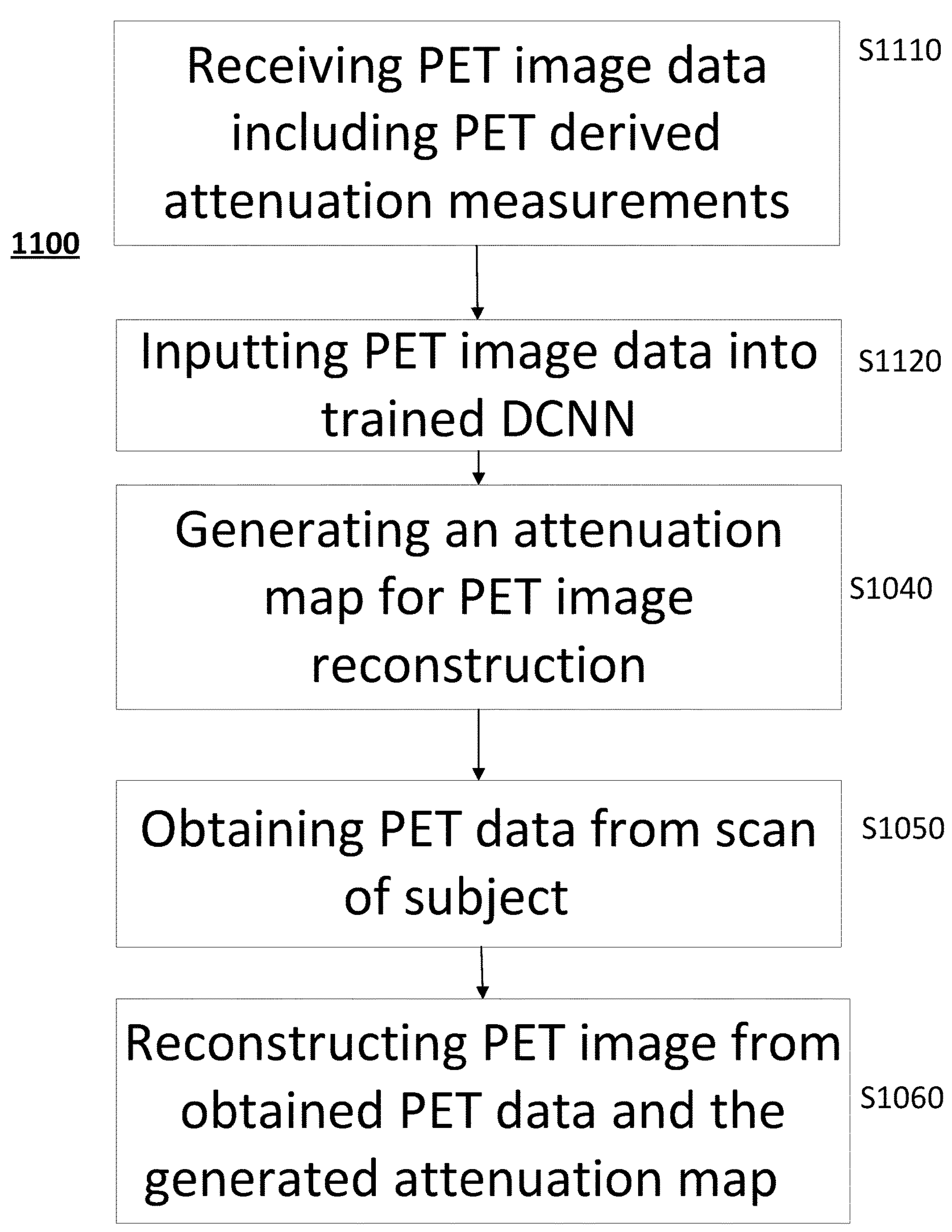
FIG. 1B illustrates another flow chart of a different disclosed method comprising receiving PET image data, inputting the PET image data into a trained DCCN model, generating an attenuation map for PET image reconstruction, obtaining PET data from a scan of a subject, and reconstructing a PET image from the obtained PET data and the generated attenuation map.

FIG. 1B illustrates another flow chart 1100 of one of the disclosed methods. In step S1110, PET-derived attenuation measurements are received or acquired based on a PET scan of a subject.

In step S1120, the PET-derived attenuation measurements are input into a trained DCCN model. The training of the DCNN model in this embodiment, as described below, can be performed based on data from one or more CT scans, from PET-derived attenuation measurements, from a high-dose spectral image of a phantom, and/or from a digital phantom.

In step S1040, an attenuation map is generated and output by the trained DCCN model based on the input image data.

In step S1050, the PET data is obtained from a PET scan of a subject.

In step S1060, a PET image of the subject is reconstructed from the obtained PET data and the attenuation map generated by the DCNN.

Figure 2A:
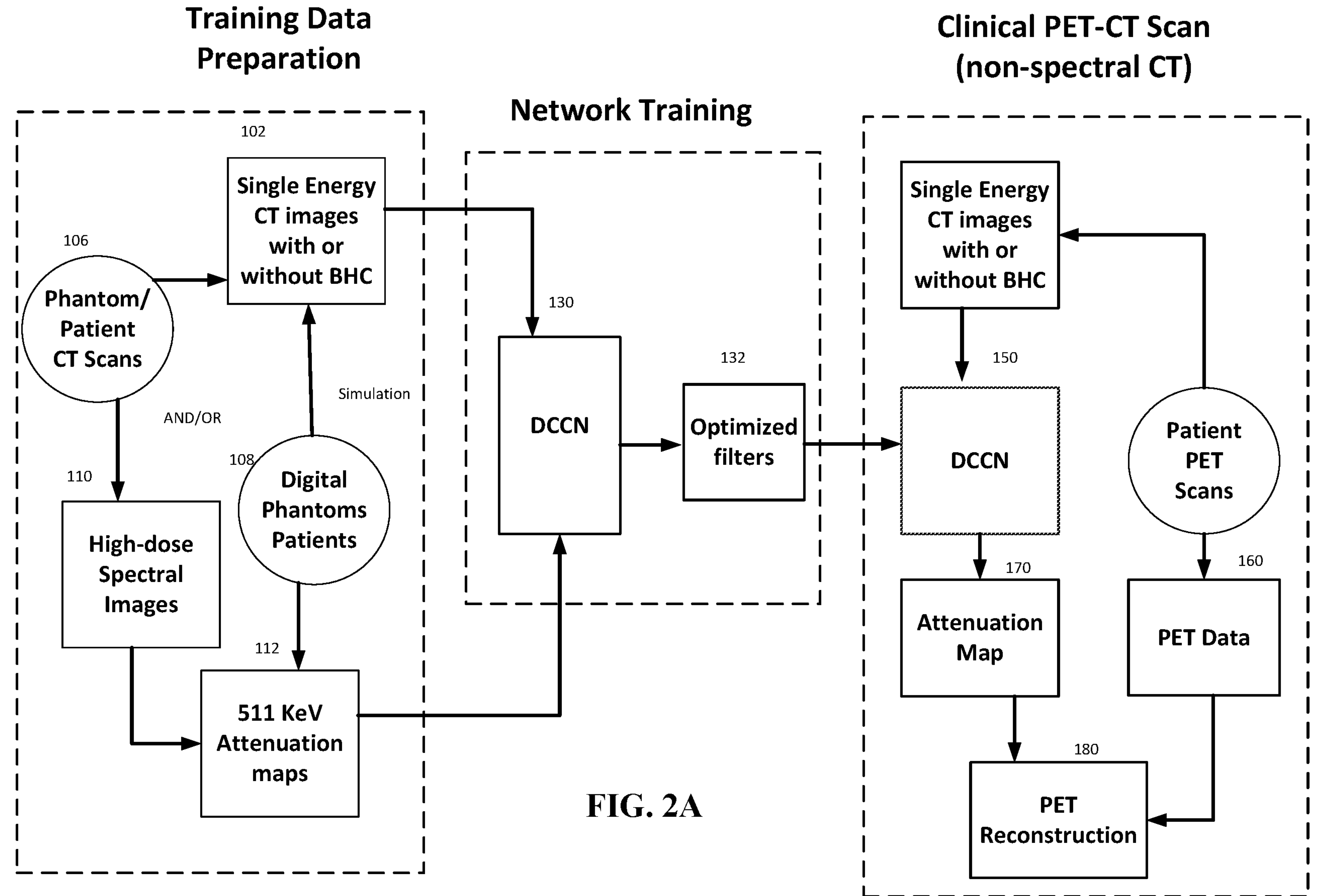
FIG. 2A illustrates a flow diagram of an embodiment of the disclosed method of DCNN network training and operation using a single-energy CT image as input into the DCNN model.

FIG. 2A illustrates a flow diagram of an embodiment of the disclosed method of DCNN network training using a single-energy CT image 102 (with or without beam-hardening correction) as training input and a corresponding 511 keV attenuation map 112 as target output during training. Beam-hardening correction, sometimes necessary due to variations in effective X-ray energy and incorrectly assigned material type, can be used to establish signatures, and allow the neural network to capture those signatures and improve accuracy in material identification and quantification. To enhance these signatures, the neural network can alternatively take as input a CT image without beam-hardening correction, or images with beam-hardening correction, but intentionally based on wrong material assumptions.

In one embodiment, single-energy CT images 102 along with the corresponding target 511 keV attenuation maps 112 are input to the DCNN model 130 during training. The parameters of the DCNN model 130 are adjusted to produce a DCNN model 150 used in actual operation.

In one embodiment, a supervised deep learning model for attenuation estimation using a CT or other image as input, and optionally uses a CT configuration parameter as an additional input. The goal is to estimate a translation function that minimizes a cost function, such as, for example, the function shown in Equation 1:

$$L_f(X, Y) = \min_f \sum_{k=1}^{K} \|(f(X)) - Y\|_2^2 \quad \text{(Equation 1)}$$

where X and Y represent the training samples of input CT images and corresponding attenuation maps from high-dose spectral CT scans. K is the number of samples. $f$ is the translational function that needs to be estimated using the neural network as shown by DCNN model 150. The loss function, such as shown in Equation 1, allows for the training of the network. A mean square error (MSE) can be used as the loss function, or alternately, a half mean square error (HMSE), a root mean square error (RMSE), or a mean absolute error (MAE) may be used as a loss function. When fully trained, the neural network directly produces a translational function converting an input CT image into an attenuation map that can be used in PET reconstruction. In another embodiment, one can also use multiple neural network structures to attempt to minimize the loss function, and the parameters of those networks will form the trained network to be used with a new pair of images.

As shown in FIG. 2A, the initial single-energy CT image 102 can be produced by using a phantom scan 106. In another embodiment, the image can be produced by a digital phantom simulation 108 or the CT image 102 can be produced by a combination of a phantom scan 106 and a digital phantom simulation. For example, GATE (Geant4 Application Tomography Emission) software packages or the like may be used to generate a digital phantom. In combination with high-dose spectral imaging 110, the phantom or digital simulation images can be used to create a more accurate 511 keV attenuation map 112 to be used for training. In still other embodiments, CT configurations can be changed, such as by changing the kVp, changing the scan duration settings, or optimizing collimator settings by use of a collimator setting optimization algorithm.

In one embodiment, the accurate training attenuation map 112 can be created using generalized spectral CT protocols and material decomposition. The 511 keV attenuation map is then used with the original single-energy CT image 102 to train the DCNN model 130. Once the DCNN training is completed, optimized filters 132 are used to produce a DCNN model 150 to be used in a clinical setting. The DCNN model 150 is then used to produce an attenuation map 160 from an input single-energy CT scan obtained from a patient scan using, e.g., a PET/CT scanner apparatus, which also produces PET data 170 used in the PET reconstruction 180.

Figure 2B:
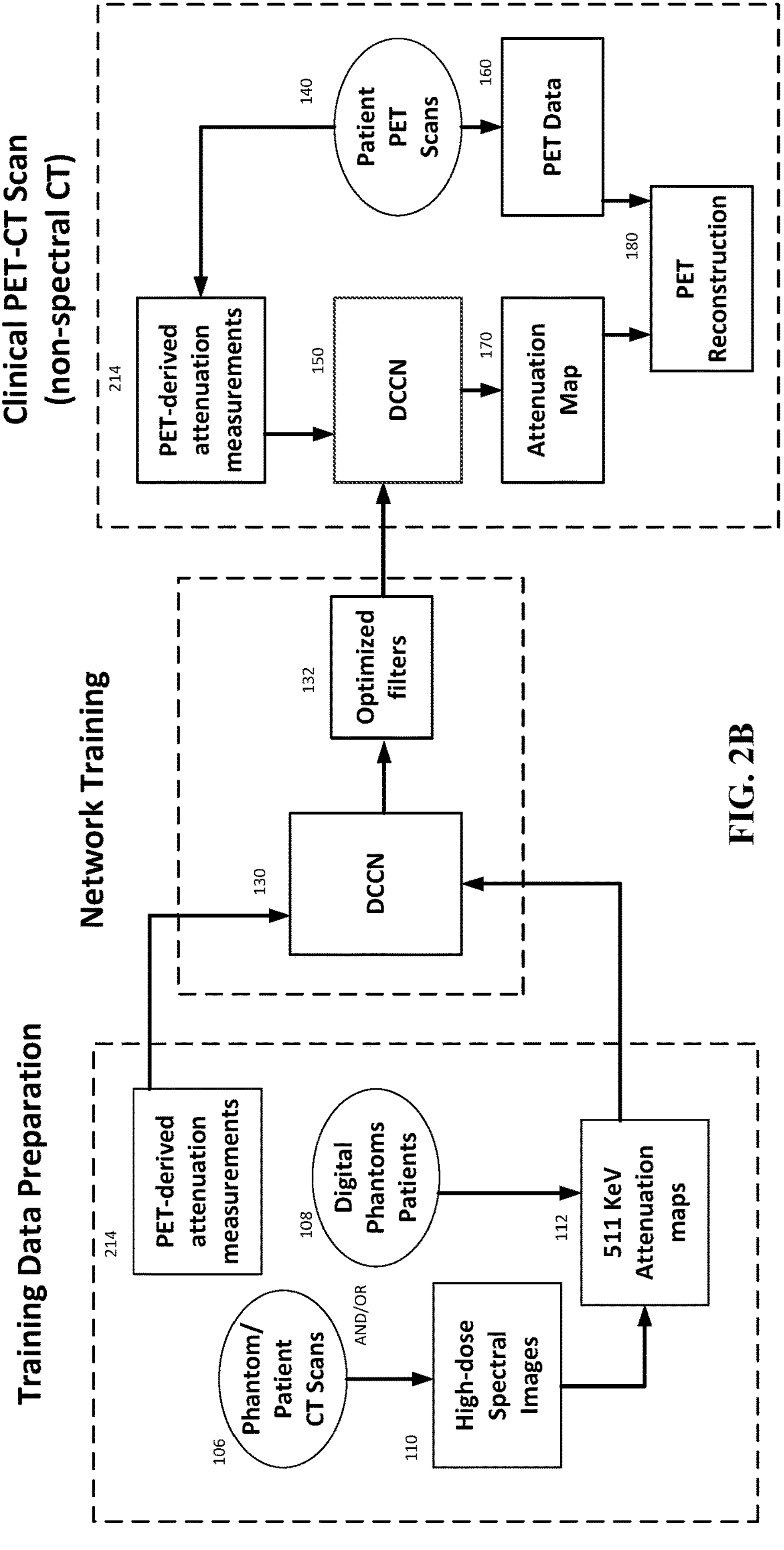
FIG. 2B illustrates a flow diagram of another embodiment using PET-derived attenuation measurements as input into the DCNN model.

FIG. 2B illustrates a flow diagram of another embodiment using PET-derived attenuation measurements that act as inputs into the DCNN model. In this embodiment, the input to the neural network to generate the 512 keV attenuation map is the PET-derived attenuation measurement 214 obtained, for example, using a process of simultaneous, model-based estimation of emission and attenuation from the PET data. See Li Y. Matej S, Karp JS. Practical joint reconstruction of activity and attenuation with autonomous scaling for time-of-flight PET. Phys Med Biol. 2020, Dec. 23, which is incorporated herein by reference.

A monoenergetic or multi-energetic, source-based transmission scan can be used in this embodiment. Traditionally, Ge-68 or Cs-137 is used for transmission scanning because they are mono-energetic and close to the 511 keV of PET annihilation photons. This embodiment can also enable lower energy sources, e.g., Co-57, to be used for reasons of cost or safety. A Lu-176 transmission scan of the object can also be used with a low-rate background gammas from a Lu-based detector.

In other embodiments, this same principal can be extended to provide input images to a DCNN model that are obtained from images different from CT. For example, SPECT data can be used as input to the DCNN training model. Further, the input to the DCNN model can come from a Magnetic Resonance (MR) image. Various MR sequences, such as MRS, can also be used to strengthen the specificity of the DCNN model.

When input images to the DCNN model come from a source different from CT, the alignment between the input images and the target attenuation maps generated from spectra-CT protocols needs to be well aligned. Special phantoms, with well-known material properties and marking structures, as recognized in both input images and target attenuation maps, can be used to mitigate the mis-alignment issue. Simulations with digital phantoms can also be used to provide both the input images and target attenuation maps for training the DCNN model.

Figure 3:
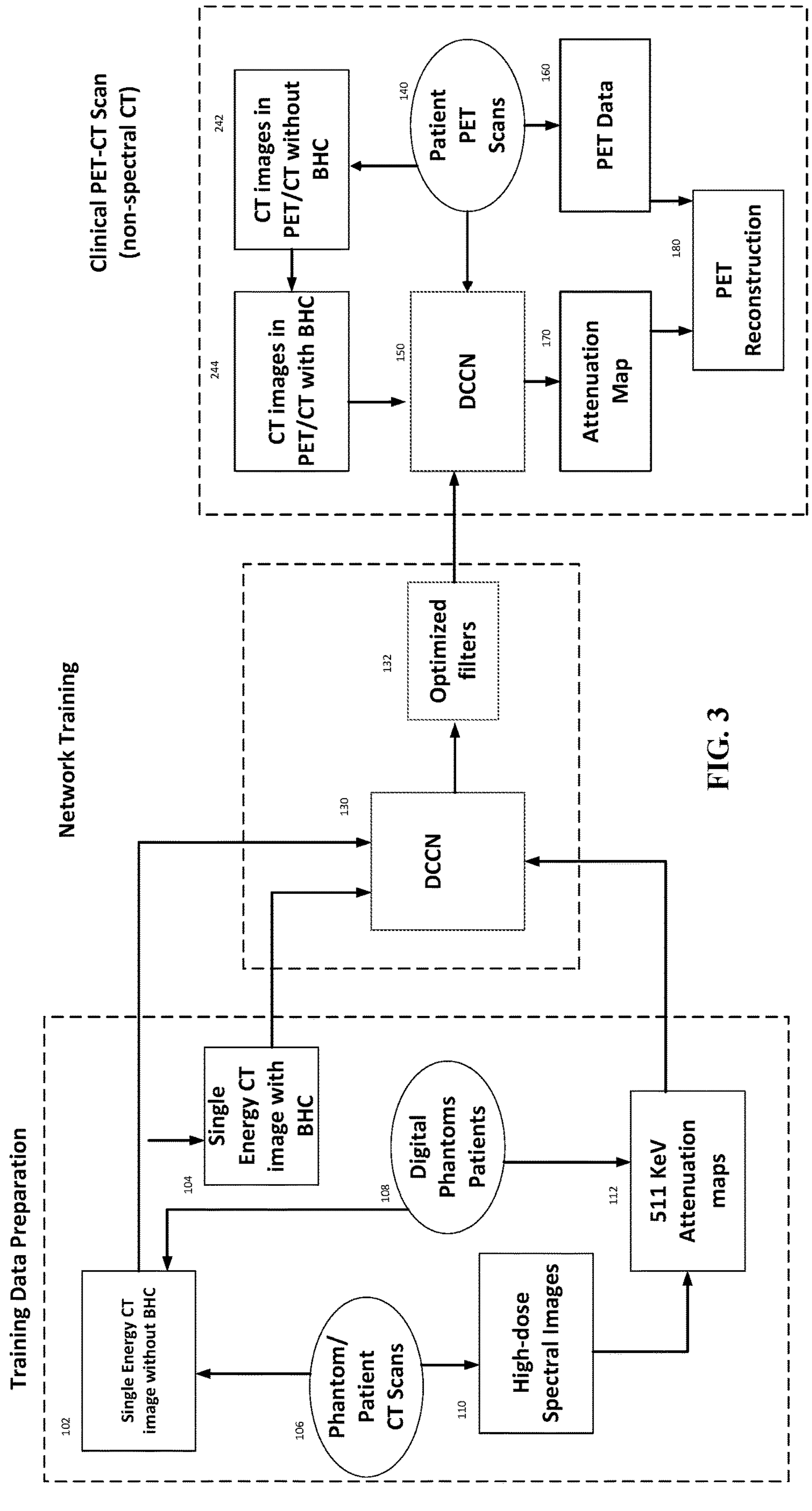
FIG. 3 illustrates a flow diagram of another embodiment using multiple single-energy CT images as input into the DCNN model.

FIG. 3 illustrates a flow diagram of another embodiment using multiple single-energy CT images as input into the DCNN model. In this embodiment, single-energy CT images with beam-hardening correction 104 and without beam-hardening correction 102 are both input to the DCNN model during training. The two or more CT images can, for example, include different types of beam-hardening correction (one material, two-material) or may include beam-hardening correction, but (intentionally) based on wrong material assumption to improve the signature of artifacts and thereby improve the DCNN. FIG. 3 further illustrates the subject CT images without beam-hardening correction 242 and the subject CT images with beam-hardening correction 244 as input to the trained DCCN 150.

Figure 4:
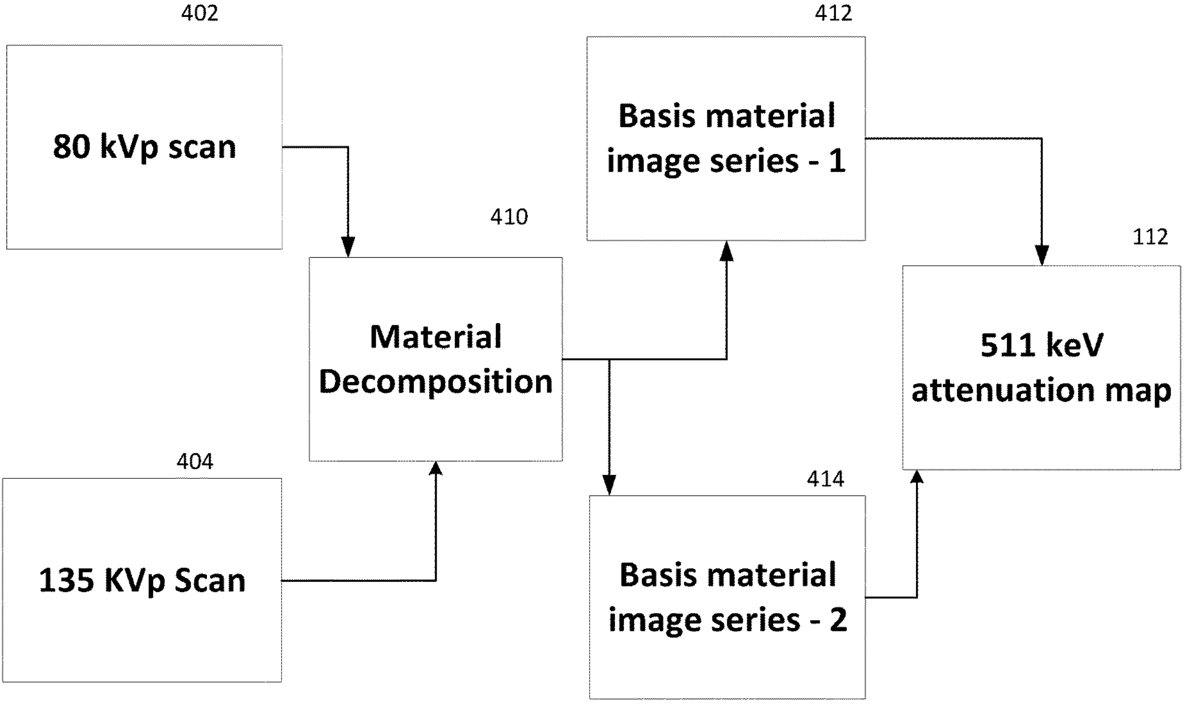
FIG. 4 illustrates a flow diagram of using at least two different scans to generate a 511 keV attenuation map using material decomposition.

FIG. 4 illustrates a flow diagram of a general rotate-rotate spectral CT protocol which uses at least two different kVp scans to generate a 511 keV attenuation map 112. FIG. 4 illustrates an 80 k Vp scan 402 and a 135 kVp scan 404. These low and high energy scans are used by material decomposition processes to produce two different basis material images 412 and 414 from which the 511 keV attenuation map is generated. Basis materials may be, for example, water and bone, or water and Iodine. Training data in this embodiment can also be provided with digital phantoms/patients with input images generated by simulating CT scans. Target output for the 511 keV attenuation map 112 can be calculated directly based on material information in the digital phantom/patient.

The proposed methods of this disclosure can either produce multiple trained networks to accommodate variations in system design or scan protocols, or the methods can be used to produce a common network with additional input of system configuration or scan protocols for general use. The neural network can also be combined with other advanced imaging processing networks for further dose reduction and reduction of artifacts.

Figure 5:
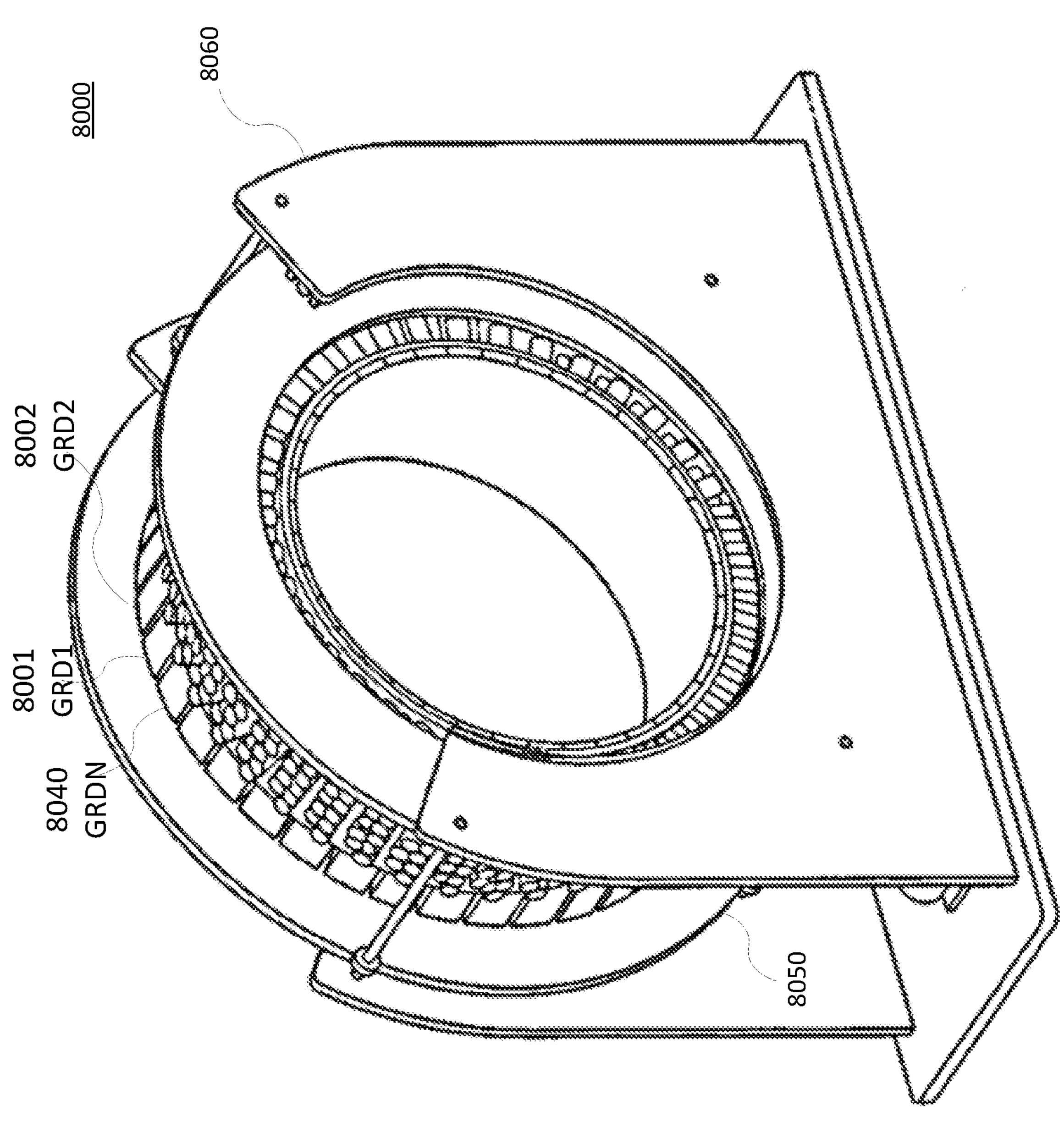
FIG. 5 is an illustration of a perspective view of a PET scanner, according to an exemplary embodiment of the present disclosure.
Figure 6:
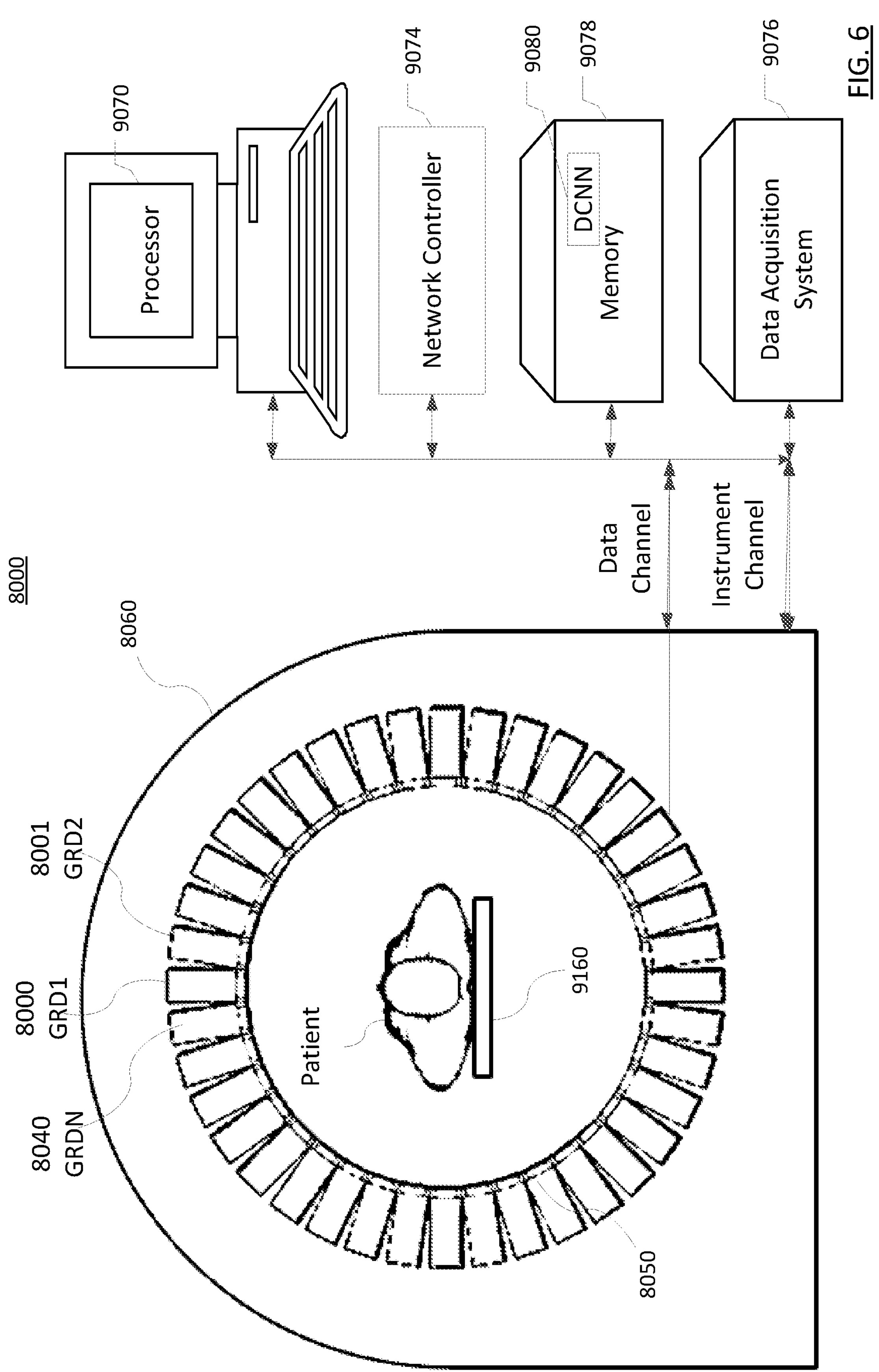
FIG. 6 is a schematic of a PET scanner and associated hardware, according to an exemplary embodiment of the present disclosure.

In one embodiment, it can be appreciated that the methods of the present disclosure are implemented within a PET scanner, as shown in FIG. 5 and FIG. 6. FIG. 5 and FIG. 6 show a PET scanner 8000 including a number of gamma-ray detectors (GRDs) 8001, 8002 . . . 8040 (e.g., GRD1, GRD2, through GRDN) that are each configured as rectangular detector modules. The PET scanner 8000 may be an adaptive axial Field of View (aaFOV) PET scanner, as introduced above. According to one implementation, each PET detector ring, which forms a cylindrical bore 8050 about a gantry 8060 includes, for example, 40 GRDs. In another implementation, there are 48 or more GRDs, the higher number of GRDs being used to create a larger bore size for the PET scanner 8000. As in the present disclosure, each PET detector ring may be independently translatable about an axial length of the aaFOV PET scanner. The translation of each PET detector ring may be accomplished by manual manipulation and/or motorized manipulation. The GRDs include scintillator crystal arrays for converting the gamma rays into scintillation photons (e.g., at optical, infrared, and ultraviolet wavelengths), which are detected by photodetectors. Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs. Further, each GRD can include a number of PMTs of various sizes, each of which is arranged to receive scintillation photons from a plurality of detector crystals. Each PMT can produce an analog signal that indicates when scintillation events occur, and an energy of the gamma ray producing the detection event. Moreover, the photons emitted from one detector crystal can be detected by more than one PMT, and, based on the analog signal produced at each PMT, the detector crystal corresponding to the detection event can be determined using Anger logic and crystal decoding, for example. However, Anger arithmetic is not necessarily required when there is a one-to-one correspondence between the crystals and the photodetectors.

FIG. 6 shows a schematic view of a PET scanner system having GRDs 8001, 8002 . . . 8040 arranged to detect gamma-rays emitted from a patient (alternately called an object, a patient, or a subject in this disclosure). The GRDs can measure the timing, position, and energy corresponding to each gamma-ray detection. In one implementation, the gamma-ray detectors are arranged in a PET detector ring, as shown in FIG. 5 and FIG. 5, and as described herein. It can be appreciated that the single PET detector ring of FIG. 6 can be extrapolated to include any number of PET detector rings along an axial length of the PET scanner. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 6 shows an example of the arrangement of the PET scanner 8000, in which an object, such as the subject or patient to be imaged, rests on a table 9160 and the GRD modules GRD1 8001 through GRDN 8040 are arranged circumferentially around the object OBJ and the table 9160. The GRDs may comprise a PET detector ring and may fixedly-connected to a cylindrical bore 8050 that is fixedly-connected to a gantry 8060. The gantry 8060 houses many parts of the PET scanner. The gantry 8060 of the PET scanner also includes an open aperture, defined by the cylindrical bore 8050, through which the object OBJ and the table 9160 can pass, and gamma-rays emitted in opposite directions from the object OBJ due to an annihilation event can be detected by the GRDs and timing and energy information can be used to determine coincidences for gamma-ray pairs.

In FIG. 6, circuitry and hardware is also shown for acquiring, storing, processing, and distributing gamma-ray detection data. The circuitry and hardware include a processor 9070, a network controller 9074 303, a memory 9078, the DCNN model 9080 stored within the memory and a data acquisition system (DAS) 9076. The PET imager also includes a data channel that routes detection measurement results from the GRDs to the DAS 9076, the processor 9070, the memory 9078, and the network controller 9074. The DAS 9076 can control the acquisition, digitization, and routing of the detection data from the detectors. In one implementation, the DAS 9076 controls the movement of the table 9160. The processor 9070 performs functions including adjusting PET detector rings, pre-reconstruction processing of the detection data, image reconstruction, and post-reconstruction processing of the image data.

According to an embodiment, the processor 9070 of the PET scanner 8000 of FIG. 5 and FIG. 6 can be configured to perform any of the methods described herein, as well as variations thereof.

According to another embodiment, there may be fewer number of GRD modules, such as, for example, a single module.

As shown in FIG. 5, the processor 9070 can include a CPU that can be implemented as discrete logic gates, as an Application Specific Integrated Circuit (ASIC), a Field Programmable Gate Array (FPGA) or another Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 9078 can be a hard disk drive, CD-ROM drive, DVD drive, FLASH drive, RAM, ROM, or any other electronic storage known in the art. The memory 9078 may be non-volatile, such as ROM, EPROM, EEPROM or FLASH memory. The memory 9078 can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 9070 can execute a computer program including a set of non-transitory computer-readable instructions that perform the methods described herein, the program being stored in any of the above-described non-transitory computer-readable medium including electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a XENON® processor from Intel of America or an OPTERON® processor from AMD of America and an operating system, such as Microsoft VISTA®, UNIX, Solaris®, LINUX, Apple MAC-OS® and other operating systems known to those skilled in the art. Further, CPU can be implemented as multiple processors locally or in a distributed cloud configuration cooperatively working in parallel to perform the instructions stored in a memory 9078 and implementing the DCNN model 9080 wherein the memory 9078 and DCNN model 9080 may be stored locally or in the distributed cloud configuration.

In one implementation, the PET scanner may include a display for displaying a reconstructed image and the like. The display can be an LCD display, CRT display, plasma display, OLED, LED, or any other display known in the art.

The network controller 9074, such as an Intel Ethernet PRO network interface card from Intel Corporation of America, can interface between the various parts of the PET imager. Additionally, the network controller 9074 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including GPRS, EDGE, 3G, 4G and 5G wireless cellular systems. The wireless network can also be Wi-Fi, Bluetooth, or any other wireless form of communication that is known.

Obviously, numerous modifications and variations are possible in light of the above teachings. It is therefore to be understood that within the scope of the appended claims, the invention may be practiced otherwise than as specifically described herein.

The method and system described herein can be implemented in a number of technologies but generally relate to imaging devices and/or processing circuitry for performing the processes described herein. In an embodiment in which neural networks are used, the processing circuitry used to train the neural network(s) need not be the same as the processing circuitry used to implement the trained neural network(s) that perform(s) the methods described herein. For example, an FPGA may be used to produce a trained neural network (e.g. as defined by its interconnections and weights), and the processor 470 and memory 478 can be used to implement the trained neural network. Moreover, the training and use of a trained neural network may use a serial implementation or a parallel implementation for increased performance (e.g., by implementing the trained neural network on a parallel processor architecture such as a graphics processor architecture).

In the preceding description, specific details have been set forth. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) A method, comprising: receiving computed tomography (CT) image data of a subject; and generating an attenuation map for Positron Emission Tomography (PET) image reconstruction by inputting the received CT image data into a trained deep convolutional neural network (DCNN) model wherein the DCNN model that outputs the attenuation map, wherein the DCNN model was trained by using training input image data and corresponding training attenuation map data generated from spectral CT image data.

(2) The method of (1), wherein the receiving step comprises receiving single-energy CT image data.

(3) The method of either (1) or (2), further comprising: obtaining PET data from a scan of a subject; and reconstructing a PET image from the obtained PET data and the generated attenuation map.

(4) The method of any of (1) to (3), further comprising obtaining the training attenuation map data from input image data obtained from a first CT scan having a first energy below 90 kVp and from a second CT scan having an energy above 125 kVp.

(5) The method of (4), further comprising generating a first basis material image and a second basis material based on the input image data.

(6) The method any of (1) to (5) further comprising obtaining the training attenuation map data from the input image data, which is produced by a spectral CT scan.

(7) The method of any of (1) to (6), further comprising obtaining the training attenuation map data from the input image data, which is obtained from a fast kV switching dual-energy CT scan.

(8) The method of any of (1) to (7), further comprising obtaining the training attenuation map data from the input image data, which is obtained from a scan using a photon-counting CT apparatus.

(9) The method of any of (1) to (8), further comprising obtaining the training attenuation map data from the input image data, which is obtained from a simulation or from a digital phantom.

(10) The method of any of (1) to (9), wherein the received CT image data was generated with beam-hardening correction turned off.

(11) The method of (1), further comprising correcting the received CT image data using a beam-hardening correction process prior to inputting the CT image data into the trained DCNN model.

(12) The method of any of (1) to (11), wherein the received CT image data includes both single-energy CT image data having been beam-hardening corrected and single-energy CT image data not having been beam-hardening corrected.

(13) The method of any of (1) to (12), further comprising training the DCNN model by minimizing a loss function.

(14) A method, comprising receiving Positron Emission Tomography (PET) attenuation data of a subject; and generating an attenuation map for PET image reconstruction by inputting the received PET-derived attenuation data into a trained deep convolutional neural network (DCNN) model that outputs the attenuation map, wherein the DCNN model was trained by using training PET-derived attenuation data as input data and corresponding training attenuation map data generated using a spectral CT protocol.

(15) An apparatus, comprising processing circuitry configured to receive computed tomography (CT) image data of a subject; and generate an attenuation map for Positron Emission Tomography (PET) image reconstruction by inputting the received CT image data to a trained deep convolutional neural network (DCNN) model that outputs the attenuation map, wherein the DCNN model is trained using training image data and corresponding training data from spectral CT image data.

(16) The apparatus of (15) wherein the processing circuitry is further configured to receive, in the CT image data, single-energy CT image data.

(17) The apparatus of either (15) or (16), wherein the processing circuitry is further configured to obtain PET data from a scan of a subject and reconstruct a PET image from the obtained PET data and the generated attenuation map.

(18) The apparatus according to any of (15) to (17), wherein the processing circuitry is further configured to obtain training attenuation map data from the input image data, which is one of data produced by a spectral CT scan, data obtained from a fast kv switching dual-energy CT scan, data obtained with a scan using a photon-counting CT apparatus, and data obtained from data obtained from simulation or a digital phantom.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Moreover, any of the elements of the appended claims may be used in conjunction with any other claim element. Rather, any limitations to embodiments of the invention are presented in the following claims.

The invention claimed is:

1. A method, comprising:

receiving integration computed tomography (CT) image data of a subject, the integration CT image data being obtained by a non-spectral CT scan; and generating an attenuation map for Positron Emission Tomography (PET) image reconstruction by inputting the received integration CT image data into a trained deep convolutional neural network (DCNN) model that outputs the attenuation map, wherein the DCNN model was trained using integration CT image data obtained by a non-spectral CT scan and corresponding training attenuation map data generated from spectral CT image data obtained by a spectral CT scan.

2. The method of claim 1, further comprising:

obtaining PET data from a scan of a subject; and reconstructing a PET image from the obtained PET data and the generated attenuation map.

3. The method of claim 1, further comprising obtaining the training attenuation map data from input image data obtained from a first CT scan having a first energy below 90 kVp and from a second CT scan having an energy above 125 kVp.

4. The method of claim 3, further comprising:

generating a first basis material image and a second basis material image based on the input image data, and generating the attenuation map from the first and second basis material images.

5. The method of claim 1, further comprising obtaining the training attenuation map data from input image data, which is produced by a spectral CT scan.

6. The method of claim 1, further comprising obtaining the training attenuation map data from input image data, which is obtained from a fast kV switching dual-energy CT scan.

7. The method of claim 1, further comprising obtaining the training attenuation map data from input image data, which is obtained from a scan using a photon-counting CT apparatus.

8. The method of claim 1, wherein the received CT image data was generated with beam-hardening correction turned off.

9. The method of claim 1, further comprising correcting the received CT image data using a beam-hardening correction process prior to inputting the CT image data into the trained DCNN model.

10. The method of claim 1, wherein the received CT image data includes both single-energy CT image data having been beam-hardening corrected and single-energy CT image data not having been beam-hardening corrected.

11. The method of claim 1, further comprising training the DCNN model by minimizing a loss function.

12. The method of claim 1, further comprising obtaining the training attenuation map data from input image data, which is obtained from a simulation or from a digital phantom.

* * * * *